(12) United States Patent
Allis

(10) Patent No.: US 8,424,492 B2
(45) Date of Patent: Apr. 23, 2013

(54) AQUARIUM WITH SWEEPER

(75) Inventor: Anthony Allis, Bronx, NY (US)

(73) Assignee: Mag-Life LLC, Scarsdale, NY (US)

( * ) Notice: Subject to any disclaimer, the term of this patent is extended or adjusted under 35 U.S.C. 154(b) by 139 days.

(21) Appl. No.: 12/825,938

(22) Filed: Jun. 29, 2010

(65) Prior Publication Data

US 2011/0011349 A1    Jan. 20, 2011

Related U.S. Application Data

(60) Provisional application No. 61/222,343, filed on Jul. 1, 2009.

(51) Int. Cl.
*A01K 63/04* (2006.01)

(52) U.S. Cl.
USPC .......................................................... 119/264

(58) Field of Classification Search .......... 119/245–247, 119/215, 224, 225, 226, 227, 251, 252, 264, 119/236, 51, 261, 263; 366/273, 274
See application file for complete search history.

(56) References Cited

U.S. PATENT DOCUMENTS

| | | | | |
|---|---|---|---|---|
| 2,958,517 A | * | 11/1960 | Harker et al. | 435/302.1 |
| 3,481,586 A | * | 12/1969 | Roberts | 366/264 |
| 3,512,646 A | * | 5/1970 | Willinger | 210/167.21 |
| 3,924,570 A | * | 12/1975 | Lamonica | 119/261 |
| 3,971,338 A | * | 7/1976 | Alexson | 119/262 |
| 4,030,450 A | * | 6/1977 | Hoult | 119/227 |
| 4,162,855 A | * | 7/1979 | Bender | 366/274 |
| 4,836,826 A | * | 6/1989 | Carter | 464/29 |
| 5,676,462 A | * | 10/1997 | Fraczek et al. | 366/171.1 |
| 6,041,740 A | * | 3/2000 | Newman | 119/261 |
| 6,072,255 A | | 6/2000 | Chiang | |
| 6,755,154 B1 | * | 6/2004 | Goldman et al. | 119/245 |
| 6,899,454 B2 | * | 5/2005 | Terentiev | 366/273 |
| 7,100,535 B2 | * | 9/2006 | Cattin et al. | 119/245 |
| 7,314,307 B2 | * | 1/2008 | Cai et al. | 366/273 |
| 2010/0193432 A1 | * | 8/2010 | McFarland | 210/616 |

OTHER PUBLICATIONS

International Preliminary Report on Patentability dated Jul. 5, 2011 issued in corresponding PCT International Application No. PCT/US10/040611.
International Search Report dated Aug. 17, 2010 in corresponding PCT application No. PCT/US10/40611.

* cited by examiner

*Primary Examiner* — Rob Swiatek
*Assistant Examiner* — Ebony Evans
(74) *Attorney, Agent, or Firm* — Ostrolenk Faber LLP

(57) ABSTRACT

An aquarium including a tank; a stirrer having one end extending upwardly from within the tan and an opposite end rotatably mounted in a bearing at a bottom of the tank; a substrate in the tank; and a sediment drain hole formed in a sidewall or a bottom of the tank.

7 Claims, 1 Drawing Sheet

AQUARIUM WITH SWEEPER

CROSS-REFERENCE TO RELATED APPLICATIONS

This application is based on and claims the benefit of U.S. Provisional Application No. 61/222,343 entitled "SPINNER BETA TANK 12," filed Jul. 1, 2009, the entire disclosure of which is incorporated by reference herein

BACKGROUND OF THE INVENTION

The present invention relates generally to aquariums and, more particularly, to an aquarium having a new and improved cleaning system.

An important step in maintenance of aquariums is regular vacuuming of the gravel or substrate 16 using water siphon. This removes debris and droppings from the substrate 16 without disturbing the aquarium's water conditions.

When using current siphons many things can go wrong. The user must be very careful when performing the operation and it is typically a very messy process. The amount of water removed needs to be monitored, the hose can come out of the bucket, the bucket can overflow, you must constantly hold the hose inside the aquarium so it doesn't fall out of the aquarium while supporting the hose so it doesn't kink. The hose drips as it moves in and out of the aquarium and interruptions during the process cause stopping and restarting of the entire process

SUMMARY OF THE INVENTION

It is a general object of the present invention to provide an aquarium with a new and improved cleaning system and, more particularly, to provide an aquarium with a cleaning system that greatly minimizes or in many cases avoids the need for cleaning using a siphon.

These and other objects of the invention are achieved by a aquarium comprising a tank and a stirrer having one end extending upwardly from within the tank and an opposite end rotatably mounted in a bearing at a bottom of the tank.

Other aspects, features and advantages of the present invention will become apparent from the following description of the invention which refers to the accompanying drawings.

DETAILED DESCRIPTION OF THE INVENTION

Figure 1:
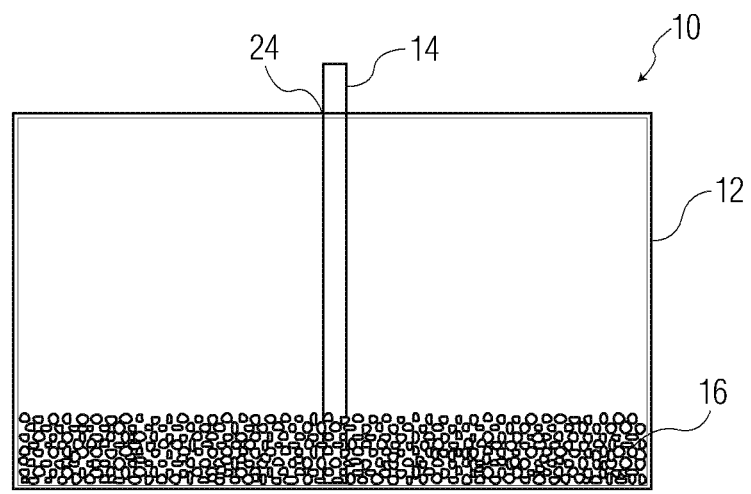
FIG. 1 is an elevational view of an aquarium illustrating certain principles of the present invention.

Referring now to the drawings and, in particular, referring to FIG. 1, there is shown an embodiment of an aquarium 10 illustrating certain features of the present invention. The aquarium includes a tank 12, a stirrer 14 and a substrate 16.

Figure 2:
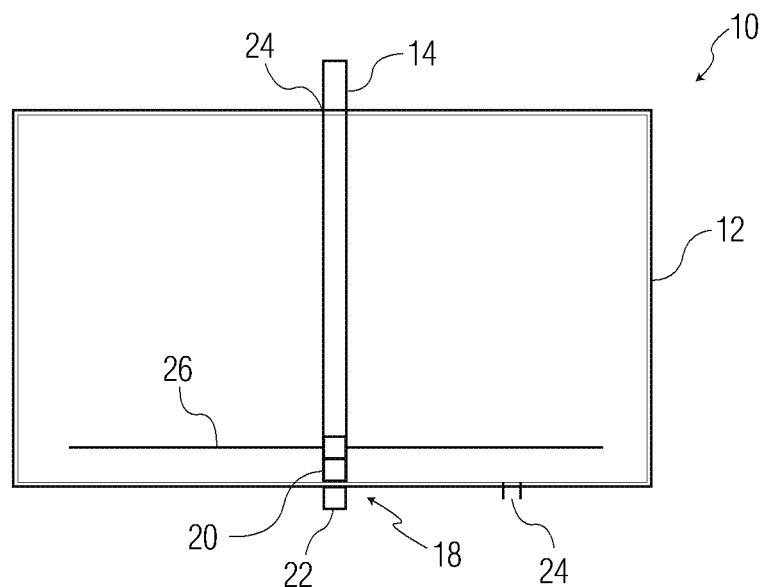
FIG. 2 is an elevational view of an aquarium with the substrate 16 thereof removed for the sake of clarity.

The stirrer 14 extends upwardly through a hole in the top of the tank 12 and downwardly to the bottom of the tank 12 where it is coupled to a two part magnetic bearing 18 comprising a first magnet 20 located within the tank 12 and connected to the stirrer 14 at its lower end and a second magnet 22 located outside of the tank 12 and coupled magnetically to the first magnet. A sediment removal system (SRS) drain hole 24 may be formed either in the bottom or side of the tank 12. In the embodiment illustrated in FIGS. 1 and 2, it is formed in the side. A plug (not shown) is used to close the drain hole 24 during normal use of the aquarium. The stirrer 14 includes a spinner 26 in the form of horizontally extending blade(s) to aid in stirring the substrate 16, as described below.

The substrate 16 may be any type material, such as sand, pebbles, crushed coral, dolomite, or crushed glass. Advantageously, the material selected for the substrate 16 should have a density slightly greater than that of water so that the substrate 16 particles are easily moved by the water. As a result the substrate 16 essentially has neutral buoyancy. Similarly, the particles should have a size and shape that promote easy movement. This, combined with the neutral buoyancy, causes the substrate 16 to function as a fluidized-bed in which the up flow of water causes the substrate 16 media to act as a fluid.

The substrate 16 hereinafter referred to as "the neutral buoyancy substrate 16" or the "NBS" also eliminates another problem, it will not have algae grow on it due to the fact that it is in motion. Since the substrate 16 remains in motion, algae cannot take hold. What is on top of the pile today is covered tomorrow and never forms algae.

The neutral buoyancy substrate 16 can be made to look exactly like the painted gravel widely used today. It may also look like natural pebbles, crushed coral or just about any other substrate 16. In fact it not only can duplicate the look of natural substrate 16s but it can also be translucent in any color or it can be made in a marbleized natural polished pebble. Experiments with neutral buoyancy substrate 16 with slight variations in density led to the neutral buoyancy substrate 16 arranging itself within the currents of the tank 12. When the lighter density version had a unique color to the higher density they arranged themselves with the lighter color in the lowest current regions and the denser collecting in the areas with higher currents.

The SRS (Sediment Removal System) drain hole 24 can be anywhere at the base of the tank 12, on the bottom or at the base of any side. The NBS (Neutral Buoyancy Substrate 16) collects all the waste. As the tank 12 produces waste it settles to the bottom of the tank 12. The NBS's property of maximum space between particles allows the waste to settle to the bottom. The space between the particles also allows water to flow through it. The rate of flow is slowest as you go deeper into it. As the flow rate slows, the dirt settles out of the water and becomes trapped on the bottom.

The system not only collects solid waste but also dissolved proteins and ammonia and other liquid waste as they are denser than water. Now the waste can be removed in many ways through the SRS drain. For this application, the stirrer 14 rod is used to gently agitate the NBS and lift the waste off the bottom and it gets caught in the flow of water out of the SRS drain. The properties of the NBS allows this using the space between its particles and the neutral buoyancy of it. By gently moving the substrate 16 with the stirrer 14, it lifts the dirt very gently and as it is denser than the water, the gentle agitation causes it to rise up just slightly and it gets caught in the flow out the base of the tank 12. If the motion caused a lot of agitation, some would go out and some would get pushed up back into the tank 12 so the gentle agitation is very efficient in this tiny application.

The Neutral Buoyancy Substrate 16 is a natural sediment collection system and the hole 24 and the agitation completes the system to remove it. Any tank 12 with the NBS collects all the waste in certain pockets where the currents are lowest. If you view the tank 12 from the bottom these areas show up as dark spots that contain this dirt. There are many ways, depending on the particular application then to remove. In the tank 12 we could also slope the bottom and have the center for example as the lowest point and put the drain there.

The concepts of SRS and NBS (Neutral buoyancy substrate) are further described in U.S. Pat. Nos. 7,249,571 and 7,430,989, and US Patent Applications 20050076851, 20070295654 and 20080217225, each of which is hereby incorporated in its entirety by reference.

The term "aquarium" as used herein means any tank, bowl, or other water-filled enclosure in which aquatic animals and/or plants are kept.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The sediment removal system collects and eliminates waste matter from aquariums or other filtered systems. Sediment such as uneaten foods, waste matter of fish, turtles etc. or any other solid waste are continuously collected and then eliminated from the system. Ammonia and other pollutants and even dissolved proteins are also caught up as they are also denser and are collected, contained and eliminated along with solid sediments and waste. Only a tiny amount of water is needed to carry out all of the collected waste products. This system is continuously operating and enables the support of much greater bio-loads in a vastly more pristine and stabile environment while greatly simplifying maintenance.

What is claimed is:

1. An aquarium, comprising:
   a tank having a sidewall; and
   a stirrer having one end extending upwardly from within the tank above the sidewall and an opposite end rotatably mounted in a bearing at a bottom of the tank, wherein the bearing comprises a first magnet located within the tank and connected to the opposite end of the stirrer and a second magnet located outside of the tank and magnetically coupled to the first magnet.

2. An aquarium according to claim 1, wherein the stirrer is centrally located within the tank.

3. An aquarium according to according to claim 1, wherein a spinner is mounted on the stirrer between the ends thereof.

4. An aquarium according to claim 1, including a sediment drain hole formed in a sidewall or a bottom of the tank.

5. An aquarium, comprising:
   a tank having a sidewall;
   a stirrer having one end extending upwardly from within the tank above the sidewall and an opposite end rotatably mounted in a bearing at a bottom of the tank, wherein the bearing comprises a first magnet located within the tank and connected to the opposite end of the stirrer and a second magnet located outside of the tank and magnetically coupled to the first magnet;
   a substrate in the tank; and
   a sediment drain hole formed in a sidewall or a bottom of the tank; and
   a spinner mounted on the stirrer between the ends thereof.

6. An aquarium according to according to claim 5, wherein the stirrer is centrally located within the tank.

7. An aquarium according to according to claim 5, wherein the substrate is a neutral buoyancy substrate.

* * * * *